Aug. 7, 1956 W. JORDAN 2,757,798
LIQUID SEPARATION PLANT
Filed Sept. 3, 1953 2 Sheets-Sheet 1

Inventor:
W. Jordan
By Glascock Downing Seebold
Attys.

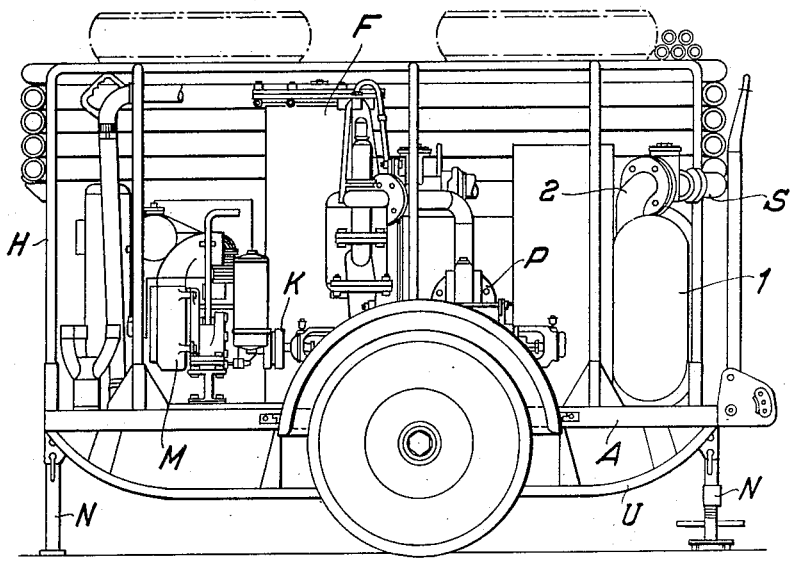
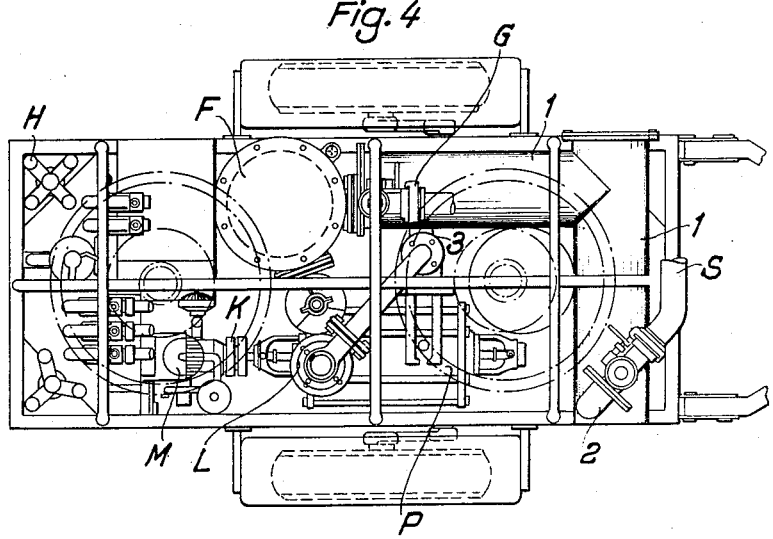

United States Patent Office 2,757,798
Patented Aug. 7, 1956

2,757,798
LIQUID SEPARATION PLANT

Walter Jordan, Braunschweig, Germany, assignor, by mesne assignments, to Walter Jordan G. m. b. H., Braunschweig, Germany, a firm Application September 3, 1953, Serial No. 378,263

Claims priority, application Germany December 2, 1952

2 Claims. (Cl. 210—54)

The present invention relates to pumping plants for the mechanical transfusion of liquids, such as motor fuel, which may contain water as heavy constituent, and is particularly directed to a special kind of water separator for such plants.

The invention contemplates to provide for the transfusion of gasoline, diesel oil or the like, a novel type of plant by means of which water can be separated from the fuel with certainty, and which in addition to that is so devised that all of the essential parts of the plant can be arranged on a common vehicle frame in the most concentrated manner, with shortest pipe connections between the various units of the plant, that is to say, with greatest savings in space and weight. The construction of the water separator of the plant is characterized by the feature that its height is large as compared with the width of its base. Because of the considerable height of the water separator, and because of the reduced speed at which the liquid passes through the water separator, even the last drop of water has ample time to separate from the liquid and to move down to the bottom of the separator.

The invention further proposes to fill the water separator partly or completely with suitable filtering material, which for motor fuel may consist of specially prepared wood shavings, so that simultaneously a separation of the larger grained impurities from the liquid is effected.

Tests made with the water separator of the invention have proved that the result is fully 100% satisfactory.

In cases where the quantity of water separated from the liquid is an extraordinarily large one, the possibility exists that a portion of the water is drawn together with the liquid into the suction tube of the pump. In order to prevent this, the invention provides the water separator with water-shut-off means which as soon as the water reaches a certain level automatically close up, so that the suction column collapses and no liquid enters the suction tube.

Additional features and advantages of the invention will be understood from a consideration of the following detailed description taken in connection with the accompanying drawings, forming a part of this specification, and in which an embodiment of the invention has been shown by way of illustration. However, I wish to say that the invention is not confined to any strict conformity with the showing of the drawings, but may be changed or modified, so long as such changes or modifications mark no material departure from the salient features of the invention as expressed in the appended claims.

In the drawings:

Fig. 3 is a side elevation of a mechanical transfusing plant provided with the water separator of Figs. 1 and 2, and mounted on a vehicle frame;

Fig. 4 is a top view of a mechanical transfusing plant provided with the water separator of Figs. 1 and 2, and mounted on a vehicle frame.

Figure 1:
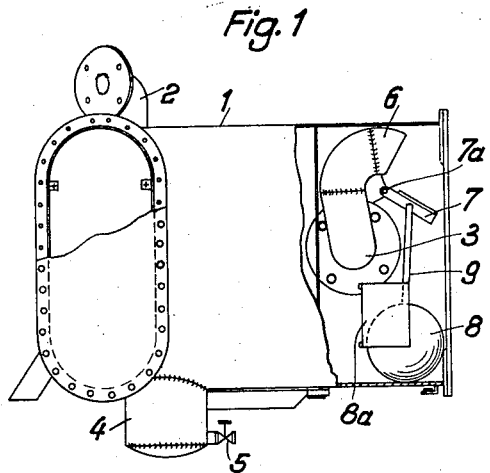
Fig. 1 is an elevational view of the water separator, with portions of the casing broken away to show the water-shut-off means.
Figure 2:
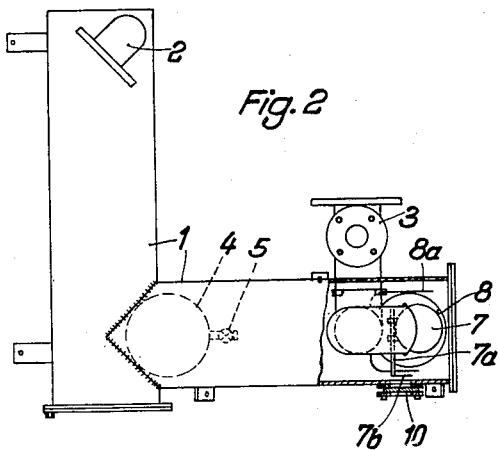
Fig. 2 is a top view of the water separator of Fig. 1, showing the angular shape of the water separator.

In the embodiment illustrated in Figs. 1 and 2, the water separator consists of a container 1 of comparatively large height, but very small base, into which the liquid to be transfused, for instance motor fuel, such as gasoline, diesel oil or the like, is sucked by means of a pump. The liquid enters the container through a connecting branch 2, and then moves at considerably reduced speed toward the outlet branch 3. The separated water accumulates in a reservoir 4, provided in the bottom of the container 1, and can be drawn therefrom via a tap 5. The container 1 may be completely or partly filled up with a filler for the prefiltering of the liquid, which filler, if the liquid to be filtered is fuel, may consist of specially prepared wood shavings.

The aforesaid outlet branch 3 is located, as shown in Fig. 1, at approximately half the height on a side wall of the container 1. Connected to and extending from the branch 3 into the interior of the container 1 is an over-flow pipe 6 which extends up to a point beneath the ceiling or upper wall of the container 1. The end of the overflow pipe 6 is so bent that the opening thereof extends downwardly. The pipe end is provided with water-shut-off means, preventing water from being sucked into the suction tube of the pump connected to the branch 3, in cases where an extraordinarily large quantity of water was separated from the liquid.

According to the invention the water-shut-off means consist of a closing member, for instance a lid 7, which is adapted for being moved into closing position exclusively by the separated water, and not by the liquid, for instance gasoline, which is to be transfused. In the embodiment illustrated by way of example in Figs. 1 and 2, the means for moving the lid 7 into closing position on the over-flow pipe 6 comprise a float 8, a rod 9 pivotally connecting the float 8 with the lid 7, and a U-shaped sheet metal member 8a fastened to the container-wall and serving as a means for guiding the float 8 in vertical direction. In order to make sure that the water-shut-off means are not actuated by the fuel, but exclusively by the heavier water, the weight of the lid 7 and of the actuating means of the lid have to be selected accordingly.

Figure 2A:
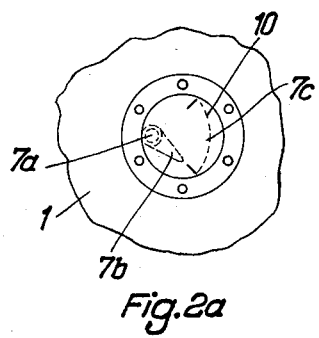
Fig. 2a is a detail view of the observation window, for the observation of the means indicating the height of the water level.

It is, of course, desirable for the operator of the device to watch the rising and falling of the water level. The customary observation openings are unsuited for this purpose because of the comparatively small height of the water column. That is why the invention provides the water-shut-off means 6 to 9 with a pin 7a adapted for rotation in conformity with the closing and opening movements of the lid 7, and accordingly also in conformity with the variations of the water level in the container. The pin 7a is at one end provided with a pointer 7b, indicating the degree of rotation of the pin 7a on the scale 7c beneath an observation window 10 (see Figs. 2 and 2a).

In the embodiment illustrated in Figs. 1 and 2 the water separator is of angular formation. The advantage of this is that a substantial part of a motoric transfusing plant can be accommodated in the angle formed by the separator and that the entire plant can be arranged on a chassis in a comparatively small space, with shortest pipe connections between the units. From an inspection of Figs. 3 and 4 of the drawings it will be seen that in the space between the angle portions of the water separator the pump P has been arranged, and that directly behind the pump P and the water separator 1, approximately transversely of the direction of motion, an air separator L and a filter F have been flanged to each other and to the pump P, so that considerable savings in weight of pipes have been made. In an arrangement like this, the driving motor M may be, by means of a coupling K, directly coupled to the pump P. To go further into details appears to be unnecessary, as the arrangement may be, apart from the water separator, of any per se known kind.

It may, however, be mentioned that the required hose pipes S can be wound around a stationary supporting member H of the vehicle frame A, and for that reason may remain attached to the inlet branch 2 of the water separator 1 and to the connecting branch G of the filter F.

Sledge runners U for the winter, and supporting screws N for the stationary support of the vehicle frame, when in action, complete the outfit of the plant.

What I claim as new and desire to secure by Letters Patent of the United States is:

1. A water separator for a pump installation arranged on a vehicle frame for handling fuel type liquids which may contain water as a heavier ingredient comprising an elongated housing of greater height than width defining a narrow, high flow channel for the liquid, a pipe joint on the top wall of the housing at one end of the housing constituting an inlet for a conduit leading the liquid to the pipe joint, a further pipe joint at the other end of the housing, a pump, a suction conduit leading from the pump to the further pipe joint, with the further pipe joint being located at a point one-half the height of the housing side wall, and extending into the housing, an overflow pipe within the housing joining with the further pipe joint extending upwardly to a point beneath the top wall of the housing with the end thereof curved so that the opening is inclined in a downward direction, a closure element for the opening of the overflow pipe pivoted beneath the curved end of the pipe, a rod pivotally connected to the closure element, a float on the lower end of the rod resting on the bottom wall of the housing, guide means within the housing cooperating with the float to guide the float vertically and the float being of such weight that it is buoyed only by water and not the fuel type liquid to operate the said closure element relative to the overflow pipe opening.

2. A water separator as defined in claim 1 further characterized in that the housing includes two sections arranged at right angles with one section extending throughout the width of the vehicle frame and forming the rear wall of the vehicle with the other section defining a part of the side wall of the vehicle and the pump being arranged in the angle of the housing on the frame.

References Cited in the file of this patent

UNITED STATES PATENTS

| | | |
|---|---|---|
| 1,909,071 | Peter | May 16, 1933 |
| 2,348,757 | Samiran | May 16, 1944 |
| 2,525,154 | Taylor | Oct. 10, 1950 |
| 2,609,099 | Griswold | Sept. 2, 1952 |